(12) United States Patent
Komoriya et al.

(10) Patent No.: US 10,457,331 B2
(45) Date of Patent: Oct. 29, 2019

(54) VEHICLE PILLAR STRUCTURE

(71) Applicant: TOYOTA JIDOSHA KABUSHIKI KAISHA, Toyota-shi, Aichi-ken (JP)

(72) Inventors: Kazuki Komoriya, Toyota (JP); Motoya Sakabe, Nisshin (JP); Koki Ikeda, Toyota (JP); Yasuhide Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/883,679

(22) Filed: Jan. 30, 2018

(65) Prior Publication Data

US 2018/0273103 A1 Sep. 27, 2018

(30) Foreign Application Priority Data

Mar. 27, 2017 (JP) .................................. 2017-061525

(51) Int. Cl.
  *B62D 25/04* (2006.01)
  *B60J 1/10* (2006.01)
  *B62D 27/04* (2006.01)
  *B62D 29/00* (2006.01)

(52) U.S. Cl.
  CPC ................ *B62D 25/04* (2013.01); *B60J 1/10* (2013.01); *B62D 27/04* (2013.01); *B62D 29/005* (2013.01)

(58) Field of Classification Search
  CPC ............. B62D 27/04; B62D 25/04; B60J 1/10
  USPC ............................................. 296/193.06, 191
  See application file for complete search history.

(56) References Cited

U.S. PATENT DOCUMENTS

| D193,550 | S  | * | 9/1962  | Mitchell ...................... D12/164 |
| 5,941,596 | A  | * | 8/1999  | See ............................ B60J 1/02 |
|          |    |   |         | 296/193.06 |
| 9,227,673 | B2 | * | 1/2016  | Berger ..................... B29C 70/68 |
| 9,963,173 | B2 | * | 5/2018  | Toyota ................... B62D 25/04 |
| 10,150,512 | B2 | * | 12/2018 | Toyota ..................... B60J 1/004 |
| 10,161,720 | B2 | * | 12/2018 | Banerjee ................... F41H 3/00 |
| D841,550 | S  | * | 2/2019  | Yamada ................. B62D 25/04 |
|          |    |   |         | D12/196 |
| 2010/0060037 | A1 | * | 3/2010  | Terai ......................... B60J 1/10 |
|          |    |   |         | 296/193.06 |
| 2011/0007411 | A1 | * | 1/2011  | Uematsu .................... B60J 1/10 |
|          |    |   |         | 359/862 |

(Continued)

FOREIGN PATENT DOCUMENTS

JP     2006-096270 A    4/2006
JP     2006-0273057 A   10/2006

*Primary Examiner* — Pinel E Romain
(74) *Attorney, Agent, or Firm* — Oliff PLC

(57) ABSTRACT

A vehicle pillar structure, including: a first pillar; a second pillar that is disposed a predetermined distance away from the first pillar substantially in a vehicle front-rear direction, with an upper end portion of the second pillar being coupled to an upper end portion of the first pillar and with a lower end portion of the second pillar being coupled to a lower end portion of the first pillar; a transparent member that spans between the first pillar and the second pillar to thereby cover an opening formed by the first pillar and the second pillar, and through which an area exterior to the vehicle can be seen; and a reinforcement member that couples a vehicle upper portion side of the first pillar to a vehicle upper portion side of the second pillar substantially in the vehicle front-rear direction.

7 Claims, 5 Drawing Sheets

(56) References Cited

U.S. PATENT DOCUMENTS

2011/0248525 A1* 10/2011 Lundstroem ........... B62D 25/04
296/191

* cited by examiner

VEHICLE PILLAR STRUCTURE

CROSS-REFERENCE TO RELATED APPLICATION

This application is based on and claims priority under 35 USC 119 from Japanese Patent Application No. 2017-061525 filed on Mar. 27, 2017, the disclosure of which is incorporated by reference herein.

BACKGROUND

Technical Field

The present disclosure relates to a vehicle pillar structure.

Related Art

Japanese Patent Application Laid-open (JP-A) No. 2006-96270 discloses a vehicle front portion structure.

In this vehicle front portion structure, a front pillar is provided on vehicle width direction outer sides of a front windshield glass, and the width of the front pillar when a driver seated in a driver's seat of the vehicle views the front pillar is set in the range of 40 mm to 58 mm. Consequently, objects on the far side of the front pillar can be seen because of the parallax between the eyes of the driver.

However, because the vehicle front portion structure disclosed in JP-A No. 2006-96270 reduces the width of the front pillar, it has the potential to lower the flexural rigidity of the front pillar. Consequently, the related art has room for improvement in this respect.

SUMMARY

In consideration of the above-described circumstances, the present disclosure provides a vehicle pillar structure that can ensure a wide field of view when driving the vehicle and can improve the rigidity of the vehicle pillar.

A vehicle pillar structure pertaining to a first aspect of the disclosure includes: a first pillar that configures part of a vehicle pillar and extends along a substantially vehicle up and down direction; a second pillar that configures another part of the vehicle pillar, is disposed a predetermined distance away from the first pillar in a substantially vehicle front and rear direction, and extends substantially parallel to the first pillar, with an upper end portion of the second pillar being coupled to an upper end portion of the first pillar and with a lower end portion of the second pillar being coupled to a lower end portion of the first pillar; a transparent member that bridges the first pillar and the second pillar and through which the outside of the vehicle can be seen; and a reinforcement member that couples a vehicle upper portion side of the first pillar and a vehicle upper portion side of the second pillar in the substantially vehicle front and rear direction.

According to the first aspect of the disclosure, the vehicle pillar structure has the first pillar, which configures part of the vehicle pillar and extends along the substantially vehicle up and down direction, and the second pillar, which configures another part of the vehicle pillar and is disposed a predetermined distance away from the first pillar in the substantially vehicle front and rear direction and extends substantially parallel to the first pillar. The first pillar and the second pillar are coupled to each other at their upper end portions and lower end portions. That is to say, the vehicle pillar is formed in a substantially rectangular frame shape configured to include the first pillar and the second pillar. Consequently, a driver seated in the driver's seat of the vehicle can see outside the vehicle through the transparent member bridging the first pillar and the second pillar from the inside of the frame of the vehicle pillar. Because of this, a wide field of view can be obtained when driving the vehicle.

Here, the vehicle upper portion side of the first pillar and the vehicle upper portion side of the second pillar are coupled to each other in the substantially vehicle front and rear direction by the reinforcement member. Consequently, the reinforcement member can control relative movement of the first pillar and the second pillar without blocking the vehicle lower side of the inside of the frame of the vehicle pillar, so the flexural rigidity of the vehicle pillar can be improved while ensuring a wide field of view in the vehicle lower side of the vehicle pillar.

A vehicle pillar structure pertaining to a second aspect of the disclosure is the first aspect, wherein the reinforcement member is formed as a beam.

According to the second aspect of the disclosure, the reinforcement member is formed as a beam. Consequently, relative movement of the first pillar and the second pillar can be controlled by the reinforcement member in a case where a load in the direction in which the first pillar and the second pillar are moved away from each other has acted on the vehicle pillar and even in a case where, conversely, a load in the direction in which the first pillar and the second pillar are moved toward each other has acted on the vehicle pillar. Furthermore, the reinforcement member formed as a beam can also control relative movement of the first pillar and the second pillar in a case where loads have acted on the vehicle pillar from various directions such as the vehicle width direction and the vehicle up and down direction.

A vehicle pillar structure pertaining to a third aspect of the disclosure is the first aspect, wherein the reinforcement member is formed as a plate, and end portions of the reinforcement member that are in abutting contact with the first pillar and the second pillar are bent in the same direction.

According to the third aspect of the disclosure, the reinforcement member is formed as a plate. Consequently, relative movement of the first pillar and the second pillar can be controlled by the reinforcement member in a case where a load in the direction in which the first pillar and the second pillar are moved away from each other has acted on the vehicle pillar and even in a case where, conversely, a load in the direction in which the first pillar and the second pillar are moved toward each other has acted on the vehicle pillar. Furthermore, the end portions of the reinforcement member that are in abutting contact with the first pillar and the second pillar are bent in the same direction. Consequently, when joining the reinforcement member to the first pillar and the second pillar, attachment workability can be improved because the bent end portions of the reinforcement member and the vehicle pillar can be joined to each other by simply accessing the vehicle pillar structure with a tool such as a welder from one side (the side where the end portions of the reinforcement member are bent) of the vehicle pillar.

A vehicle pillar structure pertaining to a fourth embodiment of the disclosure is the first aspect, wherein the reinforcement member is formed as a flexible wire.

According to the fourth aspect of the disclosure, the reinforcement member is formed as a wire. Consequently, relative movement of the first pillar and the second pillar can be controlled by the reinforcement member in a case where a load in the direction in which the first pillar and the second pillar are moved away from each other has acted on the vehicle pillar. Furthermore, because the reinforcement member is flexible, variations in the distance between the first pillar and the second pillar can be absorbed.

A vehicle pillar structure pertaining to a fifth aspect of the disclosure is any one of the first to fourth aspects, wherein at least part of the reinforcement member is transparent.

According to the fifth aspect of the disclosure, relative movement of the first pillar and the second pillar can be controlled by the reinforcement member in a case where a load in the direction in which the first pillar and the second pillar are moved away from each other has acted on the vehicle pillar and even in a case where, conversely, a load in the direction in which the first pillar and the second pillar are moved toward each other has acted on the vehicle pillar. Furthermore, because at least part of the reinforcement member is transparent, the driver seated in the driver's seat of the vehicle can see outside the vehicle through the transparent region of the reinforcement member even in the vehicle upper portion side of the inside of the frame of the vehicle pillar where the reinforcement member is provided.

It will be noted that "transparent" here includes colorless transparent, colored transparent, translucent, and colored translucent.

The vehicle pillar structure pertaining to the first aspect of the disclosure has the superior effect that it can ensure a wide field of view when driving the vehicle and can improve the rigidity of the vehicle pillar.

The vehicle pillar structure pertaining to the second aspect of the disclosure has the superior effect that it can ensure a wide field of view when driving the vehicle and can further improve the rigidity of the vehicle pillar.

The vehicle pillar structure pertaining to the third aspect of the disclosure has the superior effect that it can reduce the number of manhours for assembly.

The vehicle pillar structure pertaining to the fourth aspect of the disclosure has the superior effect that it can improve assembly workability.

The vehicle pillar structure pertaining to the fifth aspect of the disclosure has the superior effect that it can improve the rigidity of the vehicle pillar while ensuring even more a wide field of view when driving the vehicle.

BRIEF DESCRIPTION OF THE DRAWINGS

Exemplary embodiments of the present disclosure will be described in detail based on the following figures, wherein.

DETAILED DESCRIPTION

Arrow FR shown in FIG. 1 to FIG. 5 indicates a forward direction in a vehicle front and rear direction, arrow OUT indicates an outward direction in a vehicle width direction, and arrow UP indicates an upward direction in a vehicle up and down direction.

First Embodiment

A first embodiment of a vehicle pillar structure pertaining to the disclosure will be described below using FIG. 1 and FIG. 2.

Figure 1:
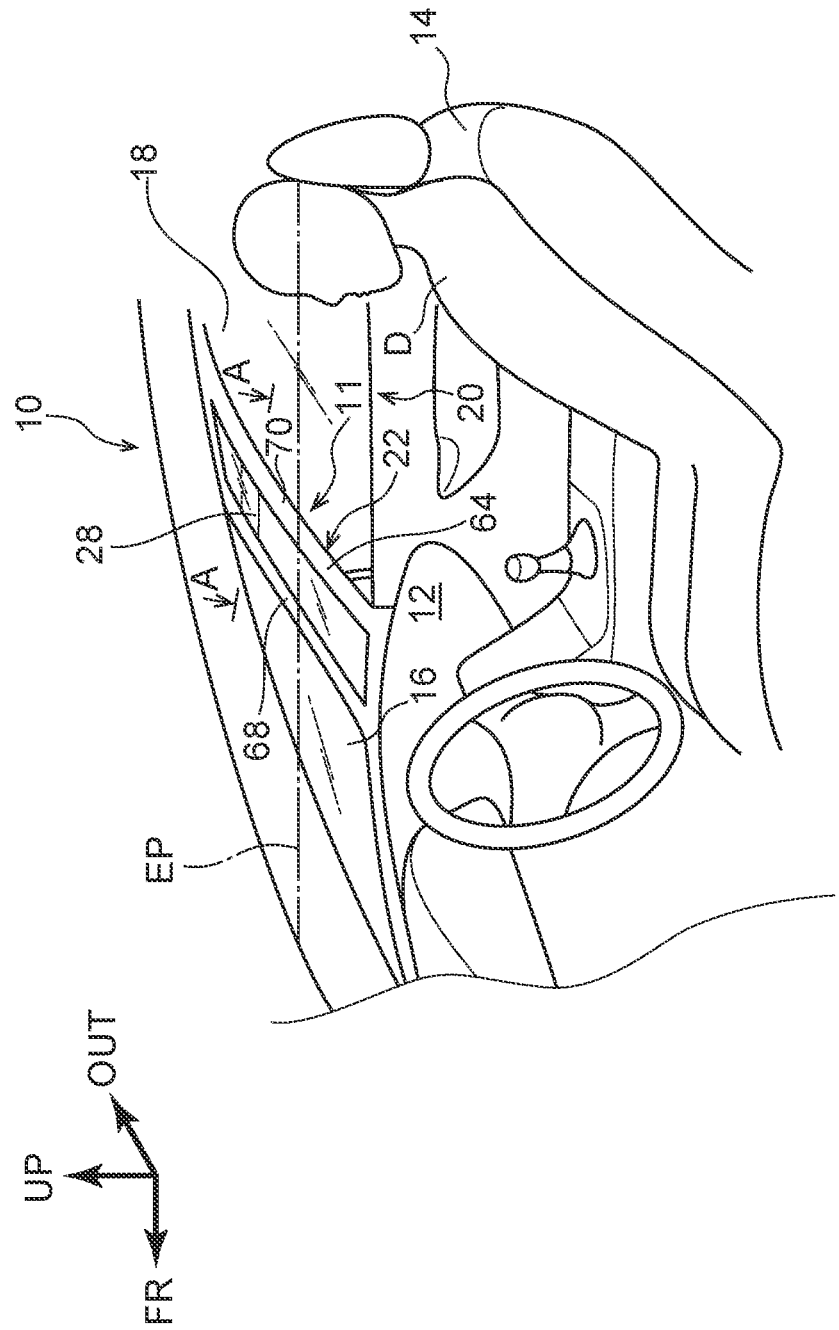
FIG. 1 is a general perspective view showing a cabin of a vehicle having a vehicle pillar structure pertaining to a first embodiment.
Figure 2:
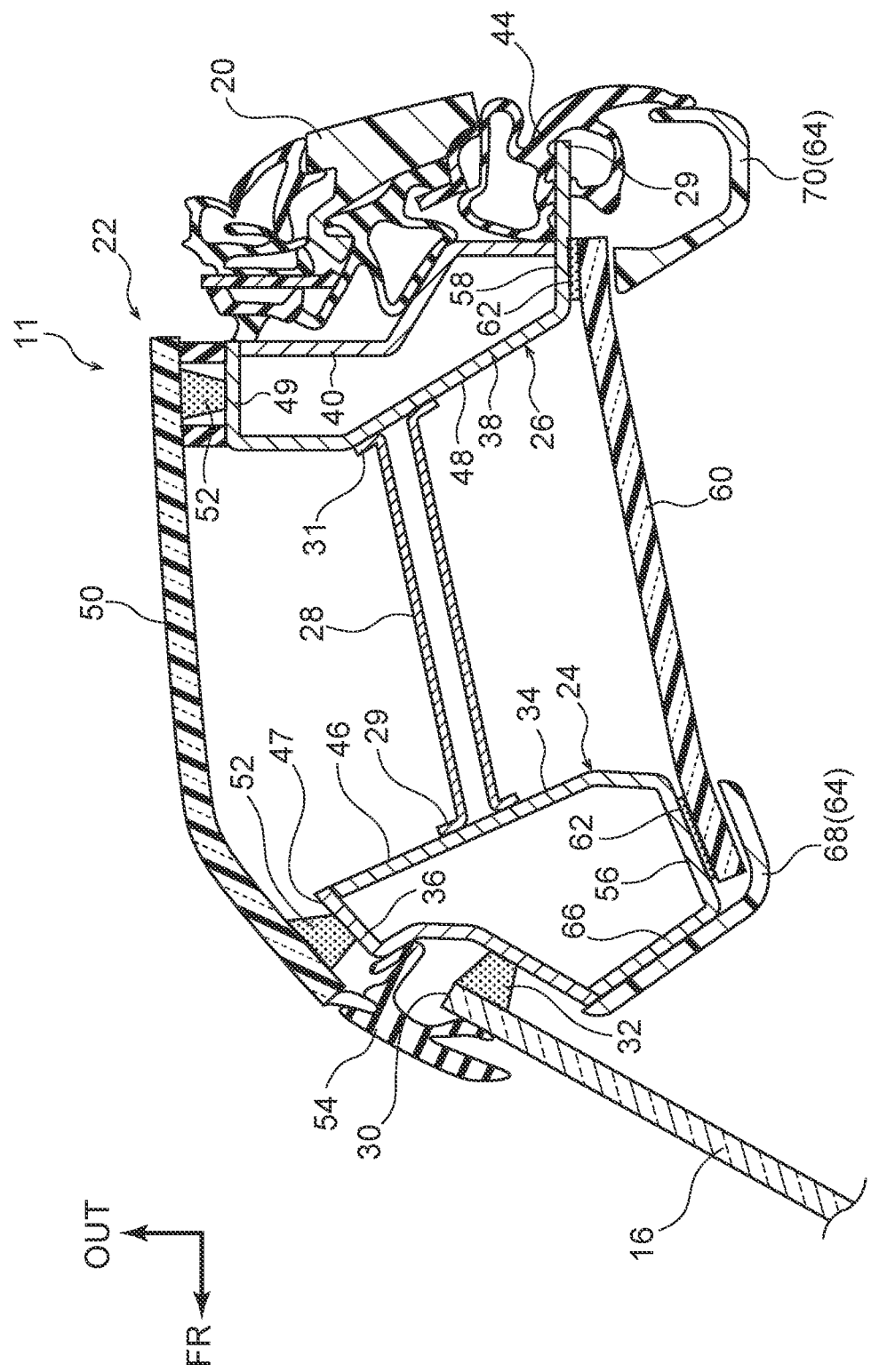
FIG. 2 is an enlarged sectional view showing a state in which the vehicle pillar structure pertaining to the first embodiment is cut along line A-A of FIG. 1.

As shown in FIG. 1, a vehicle seat 14 for a driver's seat is provided in the vehicle front side of a cabin 12 of a vehicle 10 to which a vehicle pillar structure 11 pertaining to the present embodiment has been applied, and a driver D is seated in the vehicle seat 14.

A front windshield glass 16 is provided on the vehicle front side of the vehicle seat 14. The front windshield glass 16 is a transparent window member that partitions the inside of the cabin 12 from the outside of the cabin 12 and whose thickness direction coincides with the substantially vehicle front and rear direction. The front windshield glass 16 is tilted in the vehicle rearward direction heading in the vehicle upward direction as seen in a side view. The upper end portion of the front windshield glass 16 is connected to a front header that configures a front end portion of a roof (the front header and the roof are not shown in the drawings). Furthermore, the lower end portion of the front windshield glass 16 is disposed opposing, in the vehicle front and rear direction, a rear end portion of a hood that covers, from the vehicle upper side, a power unit compartment provided on the vehicle front side. The lower end portion of the front windshield glass 16 is connected to a cowl that extends in the vehicle width direction (the hood, the power unit compartment, and the cowl are not shown in the drawings).

The front windshield glass 16 is formed in a constant thickness and has a gently curved shape so that the vehicle width direction middle section of the front windshield glass 16 becomes convex in the vehicle forward direction. Additionally, front pillars 22 serving as vehicle pillars are provided as a right and left pair on the vehicle width direction outer sides of the front windshield glass 16 and on the vehicle front sides of front doors 20 having front side windows 18.

The right and left pair of front pillars 22 extend in the substantially vehicle up and down direction along the vehicle width direction end portions of the front windshield glass 16. That is to say, the right and left pair of front pillars 22 are tilted in the vehicle rearward direction heading in the vehicle upward direction. The front pillar 22 on the opposite side of the driver's seat side will be described below, but the front pillar 22 on the driver's seat side also has the same configuration.

The front pillar 22 has a first pillar 24, a second pillar 26, and a reinforcement member 28. The first pillar 24 extends along the substantially vehicle up and down direction. As shown in FIG. 2, a vehicle width direction end portion 30 of the front windshield glass 16 is joined via a seal member 32 to the first pillar 24. The first pillar 24 is configured to include a first pillar inner member 34 and a first pillar outer member 36 that are made of steel plates. The cross section of the first pillar inner member 34 orthogonal to the longitudinal direction of the first pillar 24 (the direction in which the first pillar 24 extends along the substantially vehicle up and down direction) is shaped substantially like a "U" that opens outward in the substantially vehicle width direction. The cross section of the first pillar outer member 36 orthogonal to the longitudinal direction of the first pillar 24 (the direction in which the first pillar 24 extends along the substantially vehicle up and down direction) is shaped substantially like a crank. The first pillar outer member 36 is provided in such a way as to close off the opening in the first pillar inner member 34 from the vehicle width direction outer side.

The second pillar 26 is disposed on the substantially vehicle rear side of the first pillar 24. Specifically, the second pillar 26 is disposed a predetermined distance away from the first pillar 24 in the substantially vehicle front and rear direction. The predetermined distance is set to equal to or greater than the driver D's interpupillary distance. It will be noted that "interpupillary distance" is the distance between the center of the pupil of the right eye (not shown in the drawings) and the center of the pupil of the left eye (not shown in the drawings) of the driver D, and, for example, is about 60 to 65 mm in a Japanese adult. In the present embodiment, the predetermined distance is set to 65 mm as an example.

Furthermore, the second pillar 26 extends substantially parallel (along the substantially vehicle up and down direction) to the first pillar 24 (see FIG. 1). The second pillar 26 is configured to include a second pillar inner member 38 and a second pillar outer member 40 that are made of steel plates. The cross section of the second pillar inner member 38 orthogonal to the longitudinal direction of the second pillar 26 (the direction in which the second pillar 26 extends along the substantially vehicle up and down direction) is shaped substantially like a "U" that opens in the substantially vehicle rearward direction. The cross section of the second pillar outer member 40 orthogonal to the longitudinal direction of the second pillar 26 (the direction in which the second pillar 26 extends in the substantially vehicle up and down direction) is shaped substantially like a crank. The second pillar outer member 40 is provided in such a way as to close off the opening in the second pillar inner member 38 from the substantially vehicle rear side. An opening trim 44 is attached to a flange 29 on the vehicle width direction inner side of the second pillar inner member 38. Furthermore, a seal member of the front door 20 is abuttable against the second pillar outer member 40. It will be noted that the width dimensions of the first pillar 24 and the second pillar 26 in the substantially horizontal direction are set equal to or less than the driver D's interpupillary distance.

The first pillar 24 and the second pillar 26 are coupled to each other at their upper end portions and lower end portions. Because of this, the skeleton of the front pillar 22 is formed in a substantially rectangular frame shape including the first pillar 24 and the second pillar 26. Furthermore, the vehicle upper portion side of a vehicle rear wall portion 46 of the first pillar inner member 34 of the first pillar 24 and the vehicle upper portion side of a vehicle front wall portion 48 of the second pillar inner member 38 of the second pillar 26 are coupled to each other in the substantially vehicle front and rear direction by the reinforcement member 28. Specifically, the reinforcement member 28 is disposed on the vehicle upper side of a substantially horizontal plane EP (see FIG. 1) passing through an eyepoint E of the driver D.

The reinforcement member 28 is formed as a hollow cylinder whose longitudinal direction coincides with the substantially vehicle front and rear direction. Flanges 29 and 31 that extend outward in the radial direction of the reinforcement member 28 are formed on the longitudinal direction end portions of the reinforcement member 28. The flange 29 is joined to the vehicle rear wall portion 46 of the first pillar inner member 34, and the flange 31 is joined to the vehicle front wall portion 48 of the second pillar inner member 38.

A front pillar outer glass 50 serving as a transparent member bridges, via seal members 52, a vehicle width direction outer wall portion 47 of the first pillar outer member 36 of the first pillar 24 and a vehicle width direction outer wall portion 49 of the second pillar inner member 38 of the second pillar 26. The front pillar outer glass 50 is a transparent window member whose thickness direction coincides with the substantially vehicle width direction. The front pillar outer glass 50 is tilted in the vehicle rearward direction heading in the vehicle upward direction in such a way as to follow the first pillar 24 and the second pillar 26 as seen in a side view. It will be noted that a seal member 54 is provided between the front pillar outer glass 50 and the front windshield glass 16, and the seal member 54 prevents the ingress of rainwater and so forth between the front pillar outer glass 50 and the front windshield glass 16. It will be noted that the front pillar outer glass 50 is not limited to glass and may also be configured by transparent fiber-reinforced plastic, for example.

A front pillar inner glass 60 is attached, via adhesive 62, to a vehicle width direction inner wall portion 56 of the first pillar inner member 34 of the first pillar 24 and a vehicle width direction inner wall portion 58 of the second pillar inner member 38 of the second pillar 26. The front pillar inner glass 60 is a transparent window member whose thickness direction coincides with the substantially vehicle width direction. The front pillar inner glass 60 is tilted in the vehicle rearward direction heading in the vehicle upward direction in such a way as to follow the first pillar 24 and the second pillar 26 as seen in a side view. It will be noted that the front pillar inner glass 60 is not limited to glass and may also be configured by transparent fiber-reinforced plastic, for example.

A front pillar garnish 64 is provided on the vehicle width direction inner side of the first pillar 24 and the second pillar 26. The front pillar garnish 64 is made of plastic and is formed in a substantially rectangular frame shape including a garnish front portion 68 and a garnish rear portion 70 (see FIG. 1). The garnish front portion 68 covers, from the cabin side, the vehicle width direction inner wall portion 56 and a vehicle front wall portion 66 of the first pillar inner member 34 of the first pillar 24 and the vehicle front end portion of the front pillar inner glass 60. The garnish rear portion 70 covers, from the cabin side, the vehicle width direction inner wall portion 58 of the second pillar inner member 38 of the second pillar 26 and the vehicle rear end portion of the front pillar inner glass 60.

Action and Effects of First Embodiment

Next, the action and effects of the present embodiment will be described.

In the present embodiment, the vehicle pillar structure 11 has the first pillar 24, which configures part of the front pillar 22 provided on the vehicle width direction outer sides of the front windshield glass 16 and extends along the substantially vehicle up and down direction, and the second pillar 26, which configures another part of the front pillar 22 and is disposed a predetermined distance away from the first pillar 24 in the substantially vehicle front and rear direction and extends substantially parallel to the first pillar 24. The first pillar 24 and the second pillar 26 are coupled to each other at their upper end portions and lower end portions. That is to say, the substantially rectangular frame-shaped front pillar 22 configured to include the first pillar 24 and the second pillar 26 is provided on the vehicle width direction outer sides of the front windshield glass 16. Consequently, the driver D (see FIG. 1) seated in the driver's seat of the vehicle 10 can see outside the vehicle through the front pillar inner glass 60 and the front pillar outer glass 50 from the inside of the frame of the substantially rectangular frame-shaped front pillar 22. Because of this, a wide field of view can be obtained when driving the vehicle.

Here, the vehicle upper portion side of the first pillar 24 and the vehicle upper portion side of the second pillar 26 are coupled to each other by the reinforcement member 28. Specifically, the reinforcement member 28 is disposed on the vehicle upper side of the substantially horizontal plane EP (see FIG. 1) that passes through the eyepoint E of the driver D. Consequently, the reinforcement member 28 does not block the field of view on the vehicle lower side of the inside of the frame of the front pillar 22, that is, the vehicle lower side of the sightline of the driver D when driving, so the driver D can see obstacles and so forth on the road through the inside of the frame of the front pillar 22. Together with this, the reinforcement member 28 can control relative movement of the first pillar 24 and the second pillar 26, so the flexural rigidity of the front pillar 22 can be improved while ensuring a wide field of view in the vehicle lower side of the front pillar 22. Because of this, a wide field of view can be ensured when driving the vehicle and the rigidity of the front pillar 22 can be improved.

Furthermore, the reinforcement member 28 is formed as a beam whose longitudinal direction coincides with the substantially vehicle front and rear direction. Consequently, relative movement of the first pillar 24 and the second pillar 26 can be controlled by the reinforcement member 28 in a case where a load in the direction in which the first pillar 24 and the second pillar 26 are moved away from each other has acted on the front pillar 22 and even in a case where, conversely, a load in the direction in which the first pillar 24 and the second pillar 26 are moved toward each other has acted on the front pillar 22. Furthermore, the reinforcement member 28 formed as a beam can also control relative movement of the first pillar 24 and the second pillar 26 in a case where loads have acted on the front pillar 22 from various directions such as the vehicle width direction and the vehicle up and down direction.

It will be noted that although in the present embodiment the reinforcement member 28 is formed in a cylindrical shape, the reinforcement member 28 is not limited to this and may also be formed in another shape such as a prismatic shape. Furthermore, although the reinforcement member 28 is formed in a hollow cylindrical shape, the reinforcement member 28 is not limited to this and may also be formed in a solid cylindrical shape.

Second Embodiment

Next, a vehicle pillar structure pertaining to a second embodiment of the disclosure will be described using FIG. 3. It will be noted, regarding constituent parts that are basically the same as those in the first embodiment, that the same reference signs are assigned thereto and description thereof will be omitted.

Figure 3:
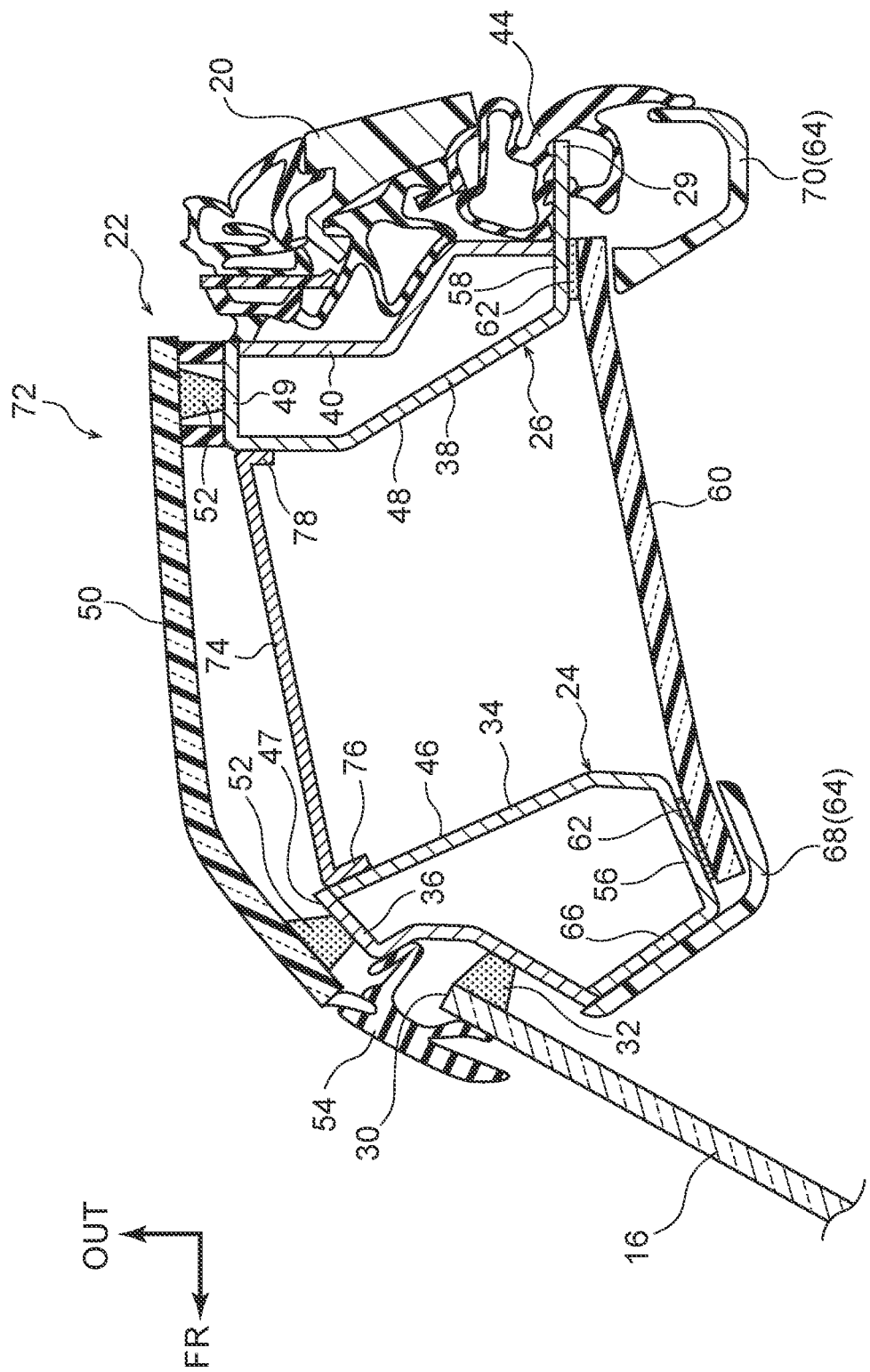
FIG. 3 is an enlarged sectional view, corresponding to FIG. 2, showing a vehicle pillar structure pertaining to a second embodiment.

As shown in FIG. 3, a vehicle pillar structure 72 pertaining to this second embodiment has the same basic configuration as that of the vehicle pillar structure 11 of the first embodiment but is characterized in that a reinforcement member 74 is formed as a plate.

That is, the vehicle upper portion side of the vehicle rear wall portion 46 of the first pillar inner member 34 of the first pillar 24 and the vehicle upper portion side of the vehicle front wall portion 48 of the second pillar inner member 38 of the second pillar 26 are coupled to each other in the substantially vehicle front and rear direction by the reinforcement member 74. Specifically, the reinforcement member 74 is disposed on the vehicle upper side of the substantially horizontal plane EP (see FIG. 1) that passes through the eyepoint E of the driver D.

The reinforcement member 74 is formed as a rectangular plate whose thickness direction coincides with the substantially vehicle width direction and whose longitudinal direction coincides with the substantially vehicle front and rear direction. Flanges 76 and 78 bent inward in the vehicle width direction are formed on the longitudinal direction end portions of the reinforcement member 74. The flange 76 is joined to the vehicle rear wall portion 46 of the first pillar inner member 34, and the flange 78 is joined to the vehicle front wall portion 48 of the second pillar inner member 38.

Action and Effects of Second Embodiment

Next, the action and effects of the present embodiment will be described.

According to the above-described configuration also, the vehicle pillar structure 72 is configured in the same way as the vehicle pillar structure 11 of the first embodiment except that the reinforcement member 74 is formed as a plate, so effects that are the same as those of the first embodiment are obtained. Furthermore, the reinforcement member 74 is formed in the shape of a plate, and the end portions of the reinforcement member 74 that are in abutting contact with the first pillar 24 and the second pillar 26 have the flanges 76 and 78 bent in the same direction. Consequently, when joining the reinforcement member 74 to the first pillar 24 and the second pillar 26, attachment workability can be improved because the flanges 76 and 78 of the reinforcement member 74 and the front pillar 22 can be joined to each other by simply accessing the vehicle pillar structure 72 with a tool such as a welder from one side (in the present embodiment, the vehicle width direction inner side) of the front pillar 22. Because of this, the number of manhours for assembly can be reduced.

It will be noted that although in the present embodiment the flanges 76 and 78 of the reinforcement member 74 are bent inward in the vehicle width direction, the flanges 76 and 78 of the reinforcement member 74 are not limited to this and may also be bent outward in the vehicle width direction or bent in another direction. Furthermore, although the thickness direction of the reinforcement member 74 coincides with the substantially vehicle width direction, the reinforcement member 74 is not limited to this and may also be configured by a plate whose thickness direction coincides with another direction such as the vehicle up and down direction.

Third Embodiment

Next, a vehicle pillar structure pertaining to a third embodiment of the disclosure will be described using FIG. 4. It will be noted, regarding constituent parts that are basically the same as those in the first embodiment, that the same reference signs are assigned thereto and description thereof will be omitted.

Figure 4:
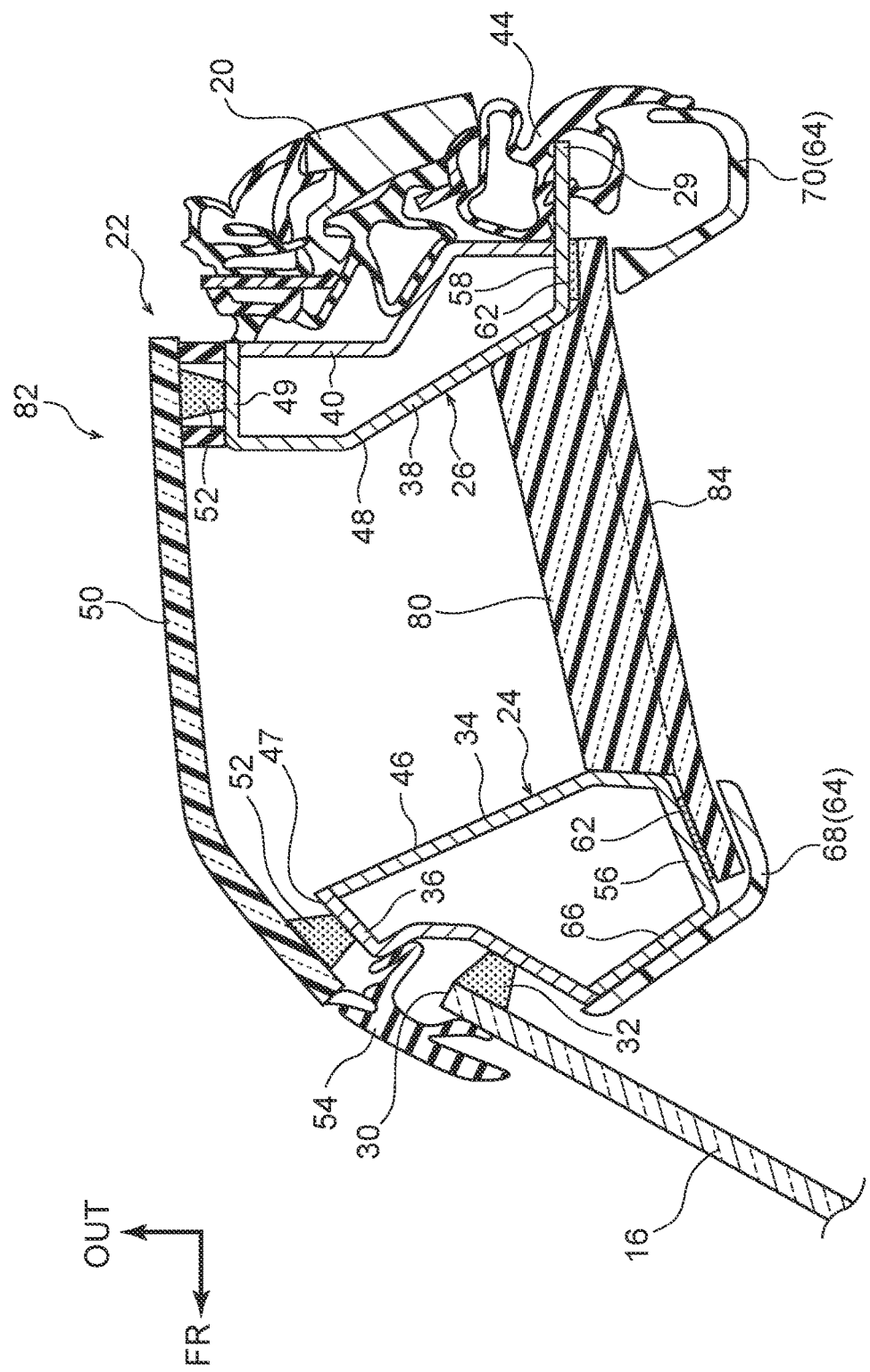
FIG. 4 is an enlarged sectional view, corresponding to FIG. 2, showing a vehicle pillar structure pertaining to a third embodiment.

As shown in FIG. 4, a vehicle pillar structure 82 pertaining to this third embodiment has the same basic configuration as that of the vehicle pillar structure 11 of the first embodiment but is characterized in that a reinforcement member 80 is transparent.

That is, the vehicle upper portion side of the vehicle rear wall portion 46 of the first pillar inner member 34 of the first pillar 24 and the vehicle upper portion side of the vehicle front wall portion 48 of the second pillar inner member 38 of the second pillar 26 are coupled to each other in the substantially vehicle front and rear direction by the reinforcement member 80. Specifically, the reinforcement member 80 is disposed on the vehicle upper side of the substantially horizontal plane EP (see FIG. 1) that passes through the eyepoint E of the driver D.

The reinforcement member 80 is formed integrally with a front pillar inner glass 84. The front pillar inner glass 84 is configured by transparent fiber-reinforced plastic, for example, and is attached via the adhesive 62 to the vehicle width direction inner wall portion 56 of the first pillar inner member 34 of the first pillar 24 and the vehicle width direction inner wall portion 58 of the second pillar inner member 38 of the second pillar 26. The front pillar inner glass 84 is a transparent window member whose thickness direction coincides with the substantially vehicle width direction. The front pillar inner glass 84 is tilted in the vehicle rearward direction heading in the vehicle upward direction in such a way as to follow the first pillar 24 and the second pillar 26 as seen in a side view.

The reinforcement member 80 is integrally formed by the same transparent member as the front pillar inner glass 84, and is formed projecting toward the outside of the vehicle from the vehicle width direction outer surface of the front pillar inner glass 84. The vehicle front end portion of the reinforcement member 80 is adhered, via an adhesive not shown in the drawings, to the vehicle rear wall portion 46 of the first pillar inner member 34. Furthermore, the vehicle rear end portion of the reinforcement member 80 is adhered, via an adhesive not shown in the drawings, to the vehicle front wall portion 48 of the second pillar inner member 38. It will be noted that although the reinforcement member 80 is configured by the same transparent member as the front pillar inner glass 84, the reinforcement member 80 is not limited to this and may also be configured by a colored transparent, translucent, or colored translucent member.

Action and Effects of Third Embodiment

Next, the action and effects of the present embodiment will be described.

According to the above-described configuration also, the vehicle pillar structure 82 is configured in the same way as the vehicle pillar structure 11 of the first embodiment except that the reinforcement member 80 is transparent, so effects that are the same as those of the first embodiment are obtained. Furthermore, because the reinforcement member 80 is transparent, the driver D seated in the driver's seat of the vehicle can see outside the vehicle through the reinforcement member 80 even in the vehicle upper portion side of the inside of the frame of the front pillar 22 where the reinforcement member 80 is provided. Because of this, the rigidity of the front pillar 22 can be improved while ensuring even more a wide field of view when driving the vehicle.

It will be noted that although in the present embodiment the reinforcement member 80 is configured by a member that is entirely transparent, the reinforcement member 80 is not limited to this and may also have a configuration where just the part between the first pillar 24 and the second pillar 26 is transparent. However, from the standpoint of ensuring a wide field of view, it is preferred that the entire reinforcement member 80 be configured by a transparent member.

Furthermore, although the reinforcement member 80 is integrated with the front pillar inner glass 84, the reinforcement member 80 is not limited to this and may also have a configuration in which it is integrated with the front pillar outer glass 50 or may also be configured separately from the front pillar outer glass 50 and the front pillar inner glass 84.

Fourth Embodiment

Next, a vehicle pillar structure pertaining to a fourth embodiment of the disclosure will be described using FIG. 5. It will be noted, regarding constituent parts that are basically the same as those in the first embodiment, that the same reference signs are assigned thereto and description thereof will be omitted.

Figure 5:
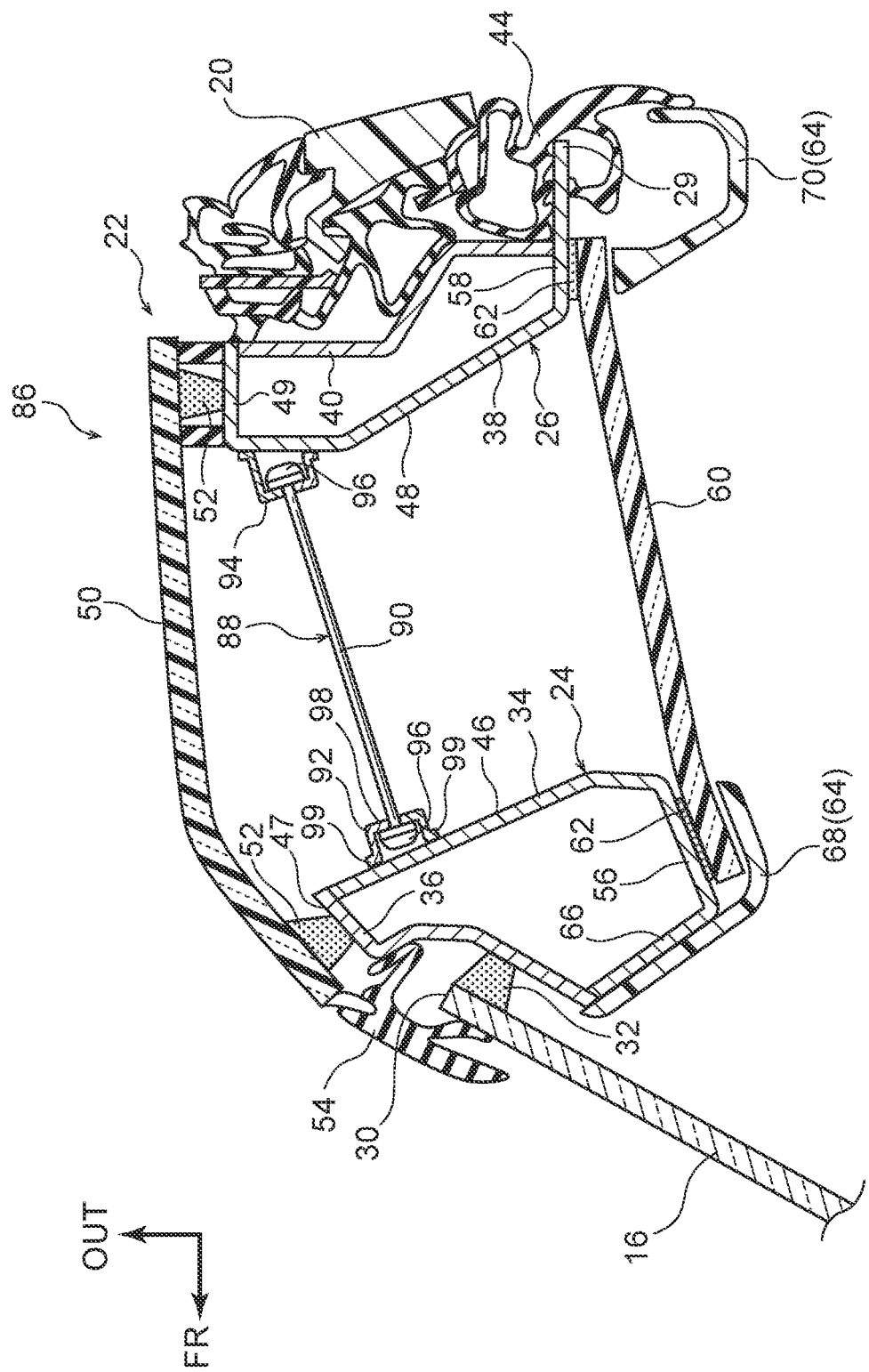
FIG. 5 is an enlarged sectional view, corresponding to FIG. 2, showing a vehicle pillar structure pertaining to a fourth embodiment.

As shown in FIG. 5, a vehicle pillar structure 86 pertaining to this fourth embodiment has the same basic configuration as that of the vehicle pillar structure 11 of the first embodiment but is characterized in that a reinforcement member 88 is formed as a wire.

That is, the vehicle upper portion side of the vehicle rear wall portion 46 of the first pillar inner member 34 of the first pillar 24 and the vehicle upper portion side of the vehicle front wall portion 48 of the second pillar inner member 38 of the second pillar 26 are coupled to each other in the substantially vehicle front and rear direction by the reinforcement member 88. Specifically, the reinforcement member 88 is disposed on the vehicle upper side of the substantially horizontal plane EP (see FIG. 1) that passes through the eyepoint E of the driver D.

The reinforcement member 88 is configured to include a flexible metal wire member 90, which extends in the substantially vehicle front and rear direction, and wire brackets 92 and 94, which are attached respectively to the vehicle rear wall portion 46 of the first pillar inner member 34 and the vehicle front wall portion 48 of the second pillar inner member 38. Engagement portions 96 are secured by swaging, for example, to both longitudinal direction end portions of the wire member 90.

The wire bracket 92 attached to the vehicle rear wall portion 46 of the first pillar inner member 34 is formed in a substantially hat-like shape that opens in the vehicle forward direction, and the wire bracket 92 has flanges 99 that are joined to the vehicle rear wall portion 46. Furthermore, the wire member 90 is inserted through a through hole formed in a bottom wall portion 98 of the wire bracket 92 in a state in which the engagement portion 96 of the wire member 90 is housed inside the wire bracket 92. It will be noted that the wire bracket 94 attached to the vehicle front wall portion 48 of the second pillar inner member 38 has a configuration that is substantially symmetrical about a transverse axis to the wire bracket 92 attached to the vehicle rear wall portion 46 of the first pillar inner member 34.

Action and Effects of Fourth Embodiment

Next, the action and effects of the present embodiment will be described.

In the above-described configuration, the vehicle pillar structure 86 has the first pillar 24, which configures part of the front pillar 22 provided on the vehicle width direction outer sides of the front windshield glass 16 and extends along the substantially vehicle up and down direction, and the second pillar 26, which configures another part of the front pillar 22 and is disposed a predetermined distance away from the first pillar 24 in the substantially vehicle front and rear direction and extends substantially parallel to the first pillar 24. The first pillar 24 and the second pillar 26 are coupled to each other at their upper end portions and lower end portions. That is to say, the substantially rectangular frame-shaped front pillar 22 configured to include the first pillar 24 and the second pillar 26 is provided on the vehicle width direction outer sides of the front windshield glass 16. Consequently, the driver D (see FIG. 1) seated in the driver's seat of the vehicle 10 can see outside the vehicle through the inside of the frame of the substantially rectangular frame-shaped front pillar 22. Because of this, a wide field of view can be obtained when driving the vehicle.

Here, the vehicle upper portion side of the first pillar 24 and the vehicle upper portion side of the second pillar 26 are coupled to each other by the reinforcement member 88. Specifically, the reinforcement member 88 is disposed on the vehicle upper side of the substantially horizontal plane EP (see FIG. 1) that passes through the eyepoint E of the driver D. Consequently, the reinforcement member 88 does not block the field of view on the vehicle lower side of the inside of the frame of the front pillar 22, that is, the vehicle lower side of the sightline of the driver D when driving, so the driver D can see obstacles and so forth on the road through the inside of the frame of the front pillar 22. Together with this, the reinforcement member 88 can control relative movement of the first pillar 24 and the second pillar 26, so the flexural rigidity of the front pillar 22 can be improved while ensuring a wide field of view in the vehicle lower side of the front pillar 22. Because of this, a wide field of view can be ensured when driving the vehicle and the rigidity of the front pillar 22 can be improved.

Furthermore, the reinforcement member 88 is formed as a wire that extends in the substantially vehicle front and rear direction. Consequently, relative movement of the first pillar 24 and the second pillar 26 can be controlled by the reinforcement member 28 in a case where a load in the direction in which the first pillar 24 and the second pillar 26 are moved away from each other has acted on the front pillar 22. Because of this, the rigidity of the front pillar 22 can be improved.

Furthermore, the reinforcement member 88 is formed as a flexible wire. Consequently, variations in the distance between the first pillar 24 and the second pillar 26 can be absorbed. Because of this, assembly workability can be improved. Moreover, a flexible wire usually has a narrow diameter, so the reinforcement member 88 itself can be made lightweight. Because of this, weight can be kept from increasing, a wide field of view can be ensured when driving the vehicle, and the rigidity of the front pillar 22 can be improved.

It will be noted that although in the present embodiment the wire member 90 is engaged with the first pillar 24 and the second pillar 26 via the wire brackets 92 and 94, the wire member 90 is not limited to this and may also have a configuration that engages directly with the first pillar 24 and the second pillar 26 without the intervention of the wire brackets 92 and 94.

Furthermore, although in the present embodiment the vehicle pillar structure 86 has a configuration where the first pillar 24 and the second pillar 26 are coupled to each other in the substantially vehicle front and rear direction by the reinforcement member 88, the vehicle pillar structure 86 is not limited to this and may also have a configuration that incorporates at least one of the reinforcement members 28, 74, and 80 of the first to third embodiments.

Furthermore, although in the first to fourth embodiments the vehicle pillar structures 11, 72, 82, and 86 are applied to the front pillar 22, the vehicle pillar structures are not limited to this and may also be applied to other vehicle pillars such as rear pillars and quarter pillars.

Embodiments of the disclosure have been described above, but the disclosure is not limited to what is described above and can naturally be modified and implemented in a variety of ways in addition to what is described above in a range that does not depart from the spirit thereof.

What is claimed is:

1. A vehicle pillar structure, comprising:
   a first pillar that configures a first part of a vehicle pillar and extends substantially along a vehicle vertical direction;
   a second pillar that configures a second part of the vehicle pillar, is disposed a predetermined distance away from the first pillar substantially in a vehicle front-rear direction, and extends substantially along the vehicle vertical direction, with an upper end portion of the second pillar being coupled to an upper end portion of the first pillar and with a lower end portion of the second pillar being coupled to a lower end portion of the first pillar;
   a transparent member that spans between the first pillar and the second pillar to thereby cover an opening formed by the first pillar and the second pillar, and through which an area exterior to the vehicle can be seen; and
   a reinforcement member that couples a vehicle upper portion side of the first pillar to a vehicle upper portion side of the second pillar substantially in the vehicle front-rear direction.

2. The vehicle pillar structure according to claim 1, wherein the reinforcement member is formed as a beam.

3. The vehicle pillar structure according to claim 1, wherein the reinforcement member is formed as a plate, and end portions of the reinforcement member that abutthe first pillar and the second pillar are bent in the same direction.

4. The vehicle pillar structure according to claim 1, wherein the reinforcement member is formed as a flexible wire.

5. The vehicle pillar structure according to claim 1, wherein at least a part of the reinforcement member is transparent.

6. The vehicle pillar structure according to claim 5, further comprising a front pillar inner glass, wherein the reinforcement member is formed integrally with the front pillar inner glass.

7. The vehicle pillar structure according to claim 1, wherein the reinforcement member is formed as a beam having a longitudinal direction that coincides substantially with the vehicle front-rear direction.

* * * * *